E. J. HAYNES.
AUTOMATIC WATER DEPTH INDICATOR.
APPLICATION FILED FEB. 28, 1917.

1,289,755.

Patented Dec. 31, 1918.
2 SHEETS—SHEET 1.

WITNESSES:
L. S. Woodhull.

INVENTOR
Elbert J. Haynes
BY
B. A. Wheeler
ATTORNEY

E. J. HAYNES.
AUTOMATIC WATER DEPTH INDICATOR.
APPLICATION FILED FEB. 28, 1917.
1,289,755.
Patented Dec. 31, 1918.
2 SHEETS—SHEET 2.
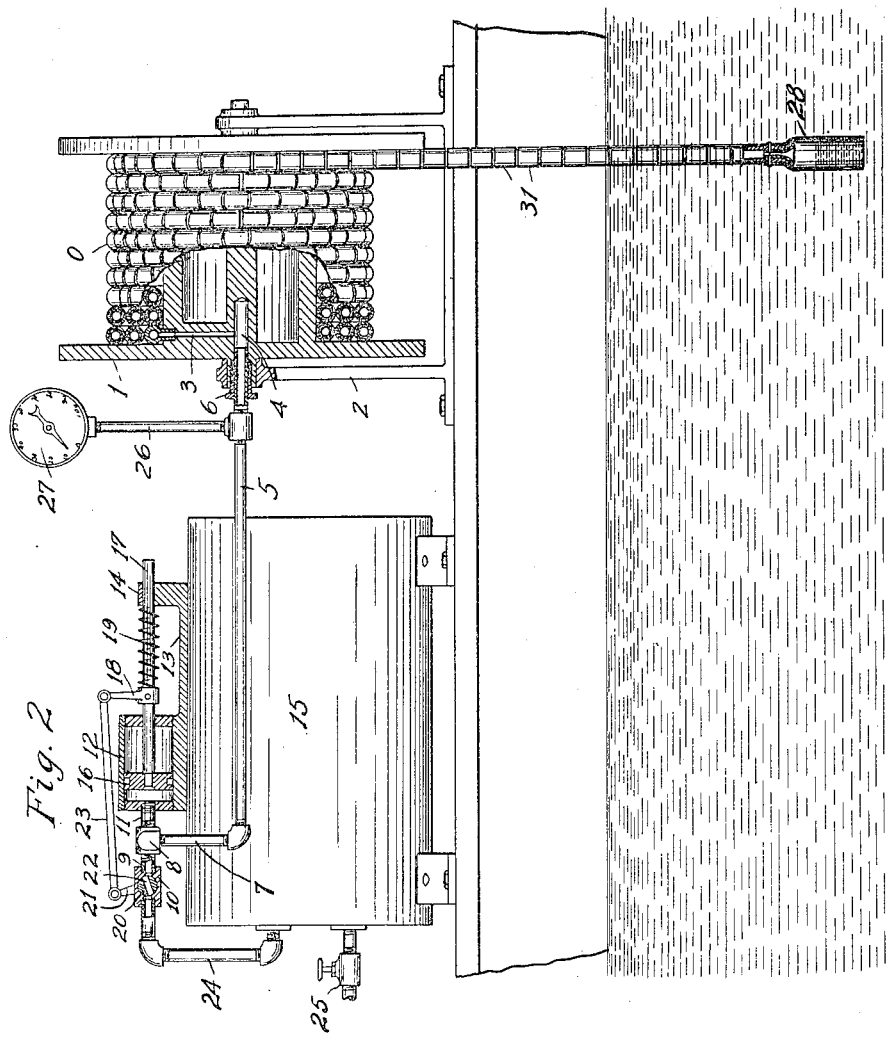
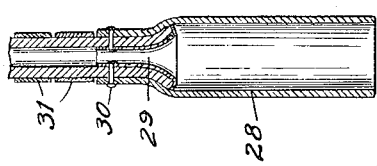
WITNESSES:
INVENTOR
Elbert J. Haynes.
ATTORNEY

UNITED STATES PATENT OFFICE.

ELBERT J. HAYNES, OF DETROIT, MICHIGAN.

AUTOMATIC WATER-DEPTH INDICATOR.

1,289,755.　　　　　Specification of Letters Patent.　　Patented Dec. 31, 1918.

Application filed February 28, 1917. Serial No. 151,443.

*To all whom it may concern:*

Be it known that I, ELBERT J. HAYNES, a citizen of the United States, residing at Detroit, in the county of Wayne, State of Michigan, have invented a new and useful Automatic Water-Depth Indicator, of which the following is a specification.

This invention relates to apparatus for measuring and indicating the depth of water, and it consists in the novel features of construction and operation as hereinafter set forth and claimed.

The invention has for its object the provision of simple and improved apparatus for use on board ships by means of which the depth of water may at any time be accurately measured and indicated, and in which the control of the apparatus is rendered automatic in the operation.

In attaining the above object the invention contemplates the employment of a flexible tubular line adapted to be immersed at one end into the water and which is connected at its opposite end to communicate with a pressure gage and with valve actuating means for controlling the delivery of air into said line from a storage tank or source of supply under pressure, whereby a flow of air is admitted to the line and the pressure induced therein through the resistance offered to the escape of the air by the pressure of the water upon the submerged end of the line will be registered by the pressure gage and the pressure thus indicated will correspond with the pressure of the water at the depth at which the end of the line is submerged. Further advantages in the operation of the apparatus are secured by the arrangement for controlling the air inlet valve in which the initial compression of the air in the line set up by the pressure of water in entering when immersing the end of the line to start the apparatus in operation is utilized to automatically open the valve and admit a sufficient flow of air under pressure to first restore the bulk of the air compressed by the pressure of the water in the line and to force the water therefrom, and thereafter cause the pressure induced in the line to further actuate the valve to control and regulate the inflow of air pressure proportionate to the increasing pressure of the water as the line is lowered to greater depths, thus automatically establishing and maintaining an even balance between the air and water pressure at the submerged end of the line and indicating accordingly on the pressure gage the depth pressure of the water.

A preferred embodiment of the essential features of the present invention is illustrated in the accompanying drawings, in which, Figure 1 is a side elevation of the apparatus shown mounted on a portion of the deck of a vessel in position for operation, and consists of a flexible tubular sounding line carried on a reel and connected to communicate with a pressure gage and an air pressure storage tank and with a piston actuated valve for controlling the delivery of air to the line.

Fig. 2 is a sectional elevation of the apparatus showing the parts in an actuated position as when in operation.

Fig. 3 is a sectional fragmentary detail of the sounding end of the line having an enlarged cylindrical terminal extension thereon.

Figure 1:
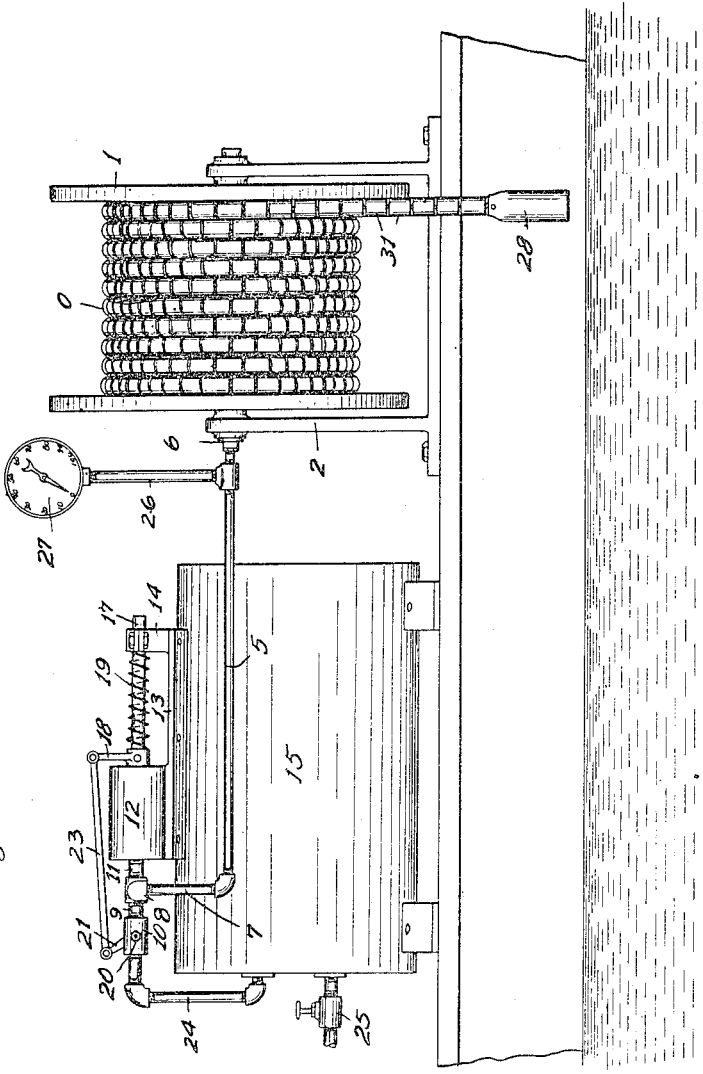

Referring to the parts of the apparatus by the characters of reference marked on the drawings, O indicates the flexible tubular sounding line which is preferably wound upon a drum or reel 1 rotatably mounted in a journal bearing hanger 2. The inner end of the line is secured to the barrel of the reel in communication with a radial passage 3 formed therein and which communicates with a bore 4 leading axially into one end of the reel through the journal bearing of the hanger 2. (See Fig. 2.) Extending at one end into the bore 4 is a pipe line 5 which is secured therein to form an air tight joint and permit the reel to rotate thereon by means of an ordinary stuffing box bearing 6 having screw threaded engagement in the end of the bore and embracing the end of the pipe. The opposite end of the line 5 is connected by a branch pipe 7 with a T-fitting 8, one branch 9 of which is connected with a valve case 10 and the other branch 11 of said T-fitting is connected in open communication with one end of a cylinder 12. This cylinder which is formed with a base 13 having a lateral bearing extension 14 thereon, and which is shown as mounted upon an air pressure storage tank 15, but may be supported in any other suitable manner, has fitted therein a reciprocal piston 16 mounted on a piston rod 17 which extends slidably through the closed end of said cylinder and through the bearing 14 of the cylinder base. Said piston rod has fixed thereon between the end of the cylinder and the bearing 14 a laterally projecting arm 18, and embracing said rod and compressed between said arm and said bearing is an expansive coiled spring 19 by which axial movement is imparted to the piston to carry it toward and normally retain it at the inlet end of the cylinder.

Rotatably seated in the valve case 10 is a valve 20 carrying a crank arm 21 and having a passage 22 for admitting and cutting off the passage of air to the pipe line and cylinder connected therewith, and pivotally connected at one end to the crank arm of the valve and at its opposite end to the arm 18 of the piston rod is a connecting rod 23, through which said valve is actuated to control the delivery of the air by the movement of the piston. The air is conveyed to the valve through a feed pipe 24 which is connected at one end to the valve case and may be connected at its opposite end with a storage tank or other source of supply under pressure, and when the storage tank 15 is employed it may be supplied with air through a valve controlled inlet, as at 25, by any suitable means for generating the desired pressure therein.

Mounted on a branch pipe 26 connected in communication with the line 6 is an ordinary pressure gage for indicating the pressure developed in the line and the indicia on the gage are so arranged and adjusted as to read zero when the line is entirely out of water and to indicate and register the depth at which the end of the sounding line is extended into the water when air is admitted to flow through the line under sufficient pressure to maintain the water excluded from the end of the line.

As the valve for controlling the inlet of air to the line is normally held closed by the piston under the pressure of the spring when the line is not immersed, and in order that the valve may be caused to open automatically with the operation of immersing the line, it is necessary to provide for creating an initial pressure in the cylinder sufficient to overcome the tension of the spring upon the piston to start the valve. This is accomplished by providing the end of the line to be immersed with an enlarged sleeve or cylindrical extension 28 which increases the area and provides a pocket for containing a sufficient volume of air to compensate for the displacement in bulk of the air in the line due to the compression of the air therein by the pressure of the water in entering the open end of the sleeve as the line is lowered into the water.

The air trapped by the sleeve in entering the water will be forced into the line and compressed by the pressure of the water, and the tension of the spring upon the piston is so adjusted that when the line shall have reached a comparatively shallow depth the pressure set up therein and delivered to the cylinder will be sufficient to overcome the resistance of the spring and move the piston to slightly open the valve and admit air under pressure from the storage tank. The pressure in the line will thus be raised until the water is forced out of the sleeve and the air finds escape into the water at the end of the line, at which time the pressure registered by the gage will indicate the depth at which the end of the line is immersed and thereafter as the line is raised or lowered the valve will be controlled by the pressure in the line to regulate the delivery of the air so as to compensate for the variations in the water pressure at different depths and maintain an equilibrium between the air and water pressures to insure the accurate and instant registration at all times of the depth of water.

It will be apparent that when the end of the line is withdrawn from the water the air escaping from the line will relieve the pressure in the cylinder and permit the spring to move the piston to close the valve so that when the end of the line is entirely removed from the water the air will be completely cut off from the line automatically.

The sleeve employed at the end of the line is shown in Fig. 3 as restricted at its upper end to receive and embrace the end of the line which is confined therein by means of a conical nipple 29 inserted to expand the end of the line into wedging engagement with the inner conforming wall of the end of the sleeve, and which is secured therein by bolts or rivets 30 extended through the engaged parts. The line may also be provided with any suitable form of armor such as series of tubular embracing sleeves 31 to render it flexible and preserve it against injury.

I claim:—

1. In a water depth indicator, a tubular open ended line adapted to be immersed at one end into the water, a source of air supply under pressure connected to communicate with the opposite end of said line, means actuable by the pressure of the water upon the atmospheric air in the line for admitting air under pressure to the line from said source of air supply, and means connected in said line for indicating the pressure developed therein.

2. In a water depth indicator, in combination with a tubular open ended line adapted to be immersed at one end into the water and connected to communicate at its opposite end with a source of air supply under pressure, a normally closed inlet valve for controlling the delivery of air from said source of supply to said line, means operably associated with said valve and line and actuable by the pressure of the water upon the atmospheric air in the line for opening said valve to admit air under pressure to said line, and means to indicate the air pressure exerted in the line.

3. In a water depth indicator, in combination with a tubular open ended line adapted to be immersed at one end into the water and connected to communicate at its opposite end with a source of air supply under pressure, an enlarged tubular extension at the immersed end of the line forming an air trapping pocket, air inlet controlling means, actuable by the pressure of the water upon the air trapped in said extension compressed into the line, for admitting air under pressure to the line from said source of air supply, and an indicator for indicating the pressure of air in the line.

4. In a water depth indicator, in combination, a tubular open ended line adapted to be immersed at one end into the water, an enlarged tubular extension connected to the immersed end of said line, a source of air supply under pressure connected to communicate with the opposite end of said line, an inlet valve controlling the delivery of air from said source of supply to said line, means to retain said valve normally closed, means actuable by the pressure of the water upon the air in said tubular extension and in said line for opening said valve to admit air under pressure from said source of air supply, and an air pressure indicator in said line.

5. In a water depth indicator, in combination with a tubular open ended line adapted to be immersed at one end into the water and connected to communicate at its opposite end with a source of air supply under pressure, an air inlet valve for controlling the delivery of air from said source of supply to said line, a cylinder connected in said line, a spring pressed reciprocal piston in said cylinder operatively connected to normally retain said valve closed, and actuable by the pressure of the water upon the air in the line for opening said valve to admit air under pressure to said line proportionate to the pressure of the water at varying depths, and means for indicating the air pressure set up in the line.

6. In a water depth indicator, in combination with a tubular open ended line adapted to be immersed at one end into the water and connected to communicate at its opposite end with a source of air supply under pressure, an enlarged tubular extension at the immersed end of the line forming an air pocket, an air inlet valve for controlling the delivery of air from said source of supply to said line, a cylinder connected in said line, a reciprocal piston in said cylinder operatively connected with said valve and spring pressed in one direction to normally retain said valve closed, said piston being actuable in the opposite direction by the initial pressure of water upon the air pocketed in said extension and compressed into the line to open said valve and admit air under pressure to said line and thereafter control the delivery of air to the line proportionate to the variations in the pressure of the water as said line is raised and lowered therein, and means to indicate the degrees of air pressure in the line.

In testimony whereof, I sign this specification.

ELBERT J. HAYNES.

Copies of this patent may be obtained for five cents each, by addressing the "Commissioner of Patents, Washington, D. C."